Figure 1:
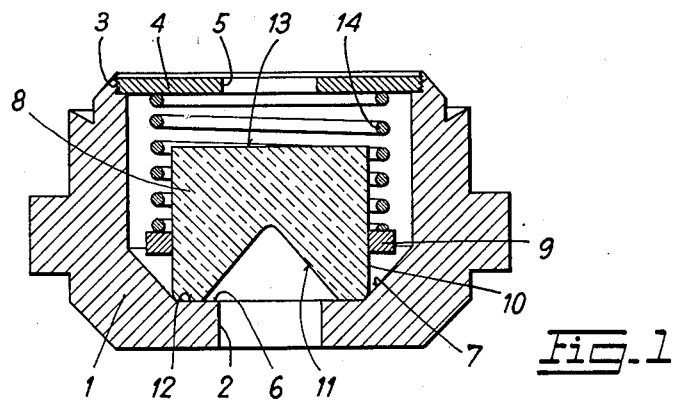

July 30, 1963  PIERRE-EUGÈNE BOURQUIN ETAL  3,099,502
SHOCK-ABSORBING PIVOT BEARING
Filed June 9, 1960

United States Patent Office
3,099,502
Patented July 30, 1963

3,099,502
SHOCK-ABSORBING PIVOT BEARING
Pierre-Eugène Bourquin, Les Fretes, Sous Les Brenets, and Charles-Emile Schlatter, Les Brenets, Switzerland, assignors to Seitz & Co., Les Brenets, Switzerland, a joint-stock company
Filed June 9, 1960, Ser. No. 34,987
Claims priority, application France June 11, 1959
7 Claims. (Cl. 308—159)

This invention relates to shock absorbing pivot bearings for precision instruments and in particular to such pivot bearings in which a movable unit comprisng a jewel is yielding within a bearing body member under the action of a return spring which holds it normally on a bearing surface portion of said body member.

Bearings of this type are commonly used in numerous precision instruments which are to be subjected either to impacts or to vibrations. Most of these bearings already known in the art do however not operate when said instruments are subjected to small impacts. The movable unit of these bearings is only yielding when the pivots journalled therein are already subjected to relatively great pressures extending beyond their mechanical strength. Moreover, most of said bearings known in the art don't yield under impacts occuring in a radial direction.

It is therefore an object of this invention to create a shock absorbing pivot bearing of the type indicated in which the movable unit already yields under very small impacts transmitted by the pivot to the bearing in an axial direction as well as in radial directions.

It is also an object of this invention to avoid in such bearings any friction between two metallic surface portions of the movable bearing unit and of the bearing body member, respectively, when said unit is yielding and coming back to its centered position.

A further object of the invention consists in mounting the movable bearing unit in such a spaced position from the bearing body that it is clamped exclusively between the return spring and the centering surface portion of the latter, thus avoiding any further contact between said movable bearing unit and said body member.

It is still another object of this invention to enable making a return spring with well determined mechanical properties.

Still further objects of the invention will appear in the course of the following description.

Five embodiments of the shock absorbing pivot bearing according to the invention are represented by way of example in the drawings annexed to this specification.

In the drawings:
FIGS. 1 to 5 are cross-sectional views each of one of said embodiments.

The bearing represented in FIG. 1 comprises a machined body member 1 which can for instance be made of hard brass. This member 1 has a bottom portion provided with a cylindrical opening 2 through which the end of a shaft (not shown) can enter the bearing to be journalled therein. The lower face of this bottom portion is situated opposite a shoulder of said shaft and it limits the possible axial displacement of the latter toward the bearing. The side face of bore 2 similarly serves as abutting means to limit the transverse displacements of said shaft with respect to the bearing. At its top portion the body member 1 is provided with a tapped lodging 3 coaxial to opening 2. A cover member 4 provided with a central opening 5 is screwed into lodging 3. Opening 5 enables observing whether the elements mounted in the body member 1 function correctly. Instead of providing the cover member 4 with screw threads, this member could also be made with a smooth side face and be pressed with force fit or riveted in a corresponding lodging of body member 1. The upper face of the bottom portion of this body member forms an annular flat bearing surface portion 6 surrounding opening 2. The inner surface of the body member 1 also comprises a centering truncated conical portion 7 having its opening directed upwards. The surface portion 7 is extending adjacent and around the bearing end portion 6.

Both surface portions 6 and 7 of member 1, with which the movable bearing unit comes in contact in a manner described hereinafter, are preferably machined simultaneously by means of a tool comprising a diamond provided with two cutting edges. As well known by those skilled in the art, such a diamond tool enables producing surface portions having a high polish and being thus entirely free from the small grooves resulting from the similar operations carried out by means of tools on which the cutting edges are provided on a hard metal piece.

With a tool of the type indicated above it is however hardly possible to make a surface portion 6 which would be mathematically plane and perpendicular to the bearing axis. During its working operation the tool described is moved in a direction extending in parallel with the axis of member 1. Should now this tool be provided with a front cutting edge perpendicular to said axis, the tool would vibrate during its operation and produce a more or less irregular surface, while incurring the risk of breaking. With a tool having a front cutting edge either a little bit curved or straight, but forming an angle of 1 to 2° with a plane perpendicular to the bearing axis, any vibration is avoided. The bearing surface portion 6 obtained with such a tool is accordingly slightly concave or has a truncated conical shape having however an opening angle of 175 to 178°.

As regards the members mounted in body member 1 they firstly consist of a movable bearing unit comprising a jewel 8. This jewel 8 is made with a cylindrical side-face 10 and a ring 9 is set with force fit around face 10. Jewel 8 is also provided with a plane lower face 12 normally resting on the end surface portion 6. A conical pivot receiving lodging 11 with a rounded top portion is provided in this lower face 12 opposite opening 2. The upper face 13 of jewel 8 is also plane and circular.

The particular shape of this upper face 13 is however not very important. Instead of being plane, this face 13 could also be bulged, spherical or slightly conical. The lower face 12 of jewel 8 could also have a shape similar to that of face 13. To maintain the axis of jewel 8 parallel to that of body member 1 when this jewel is in its centered position, the lower jewel face 12 and the bearing portion 6 must however correspond to each other in such a manner that the jewel cannot possibly tilt on its bearing portion but stays steadily thereon while having preferably its outer lower edge in contact with surface portion 6.

A cylindrical coil spring 14 is also mounted in body member 1. This spring is partly extending around jewel 8 and it is mounted in a compressed condition between ring 9 and cover member 4. This spring could be made for instance of phosphorous bronze. To exert a uniform action all round the jewel this spring has its two end coils flat. FIG. 1 shows that jewel 8 can move toward cover member 4 against the action of spring 14 under the effect of an axial impact. If said impact occurs in another direction, the jewel 8 can also move transversely with respect to body member 1. After an impact occurring in an oblique or a radial direction the rounded outer edge of face 12 has a portion in contact with the centering surface portion 7 and another portion in contact with the bearing end portion 6. If the jewel 8 has left the bottom portion of body member 1 during said impact, it will first be brought back by spring 14 to said position in which the jewel is inclined with respect to the body member. In said inclined position of jewel 8 the spring 14 is not only compressed axially, it is also bent laterally so that its action on ring 9 not only consists in an axial downward thrust but also in a lateral thrust urging the movable bearing unit (8, 9) toward the bearing body axis. Under this action of spring 14 the jewel 8 will slide along surface portions 7 and 6 and come back to its original position in which it is exactly centered with respect to said body member. Since the jewel edge formed between the faces 10 and 12 is rounded, any scratch of the inner surface of the body member during a yielding motion of unit (8, 9) will be avoided. If the element journalled in the bearing described happens to be subjected to a radial impact, the force transmitted by the pivot of this element to jewel 8 will nevertheless have an axial component since the surface of lodging 11 on which the pivot is bearing is inclined. The force transmitted by the pivot to the jewel is of course obviously perpendicular to this side-face. The opening angle of the centering surface portion 7 can accordingly be made substantially smaller than with bearings in which the pivot is journalled in a central bore of a pierced jewel.

FIG. 1 shows that jewel 8 stands without any radial play on the bearing portion 6 of body member 1. Practically it will however not be possible to adjust always the jewel and the bearing body member as exactly as shown in FIG. 1. The manufacturing tolerances of the bearing body member can however be chosen with respect to jewel 8 so that the latter stands in any case on surface portion 6 and not on the centering surface portion 7 when the jewel axis coincides with that of the bearing body. Experience taught that the radial play of jewel 8, which must be admitted within the smaller end of the truncated conical surface portion 7, can always be made smaller than two hundredths of a millimeter.

Figure 2:
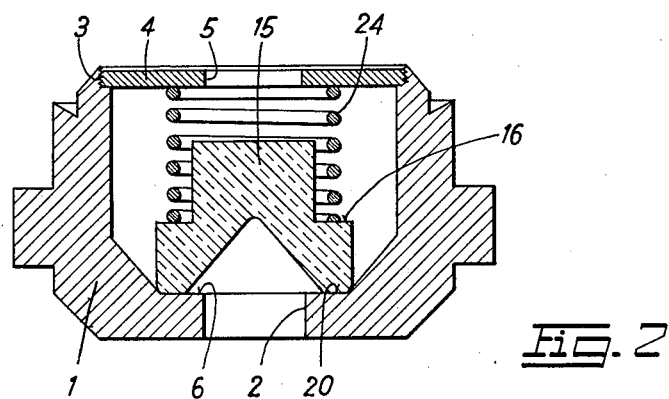

In the second embodiment shown at FIG. 2 the movable bearing unit wholly consists of a jewel 15. This jewel has a small upper cylindrical portion and an enlarged lower cylindrical portion. A flat annular shoulder 16 is formed between both jewel portions. This shoulder 16 serves as bearing surface to a coil spring 24. This coil spring as well as the other parts of this second embodiment have identical functions as the corresponding parts of the bearing of FIG. 1 and they can be made in a similar manner.

Figure 3:
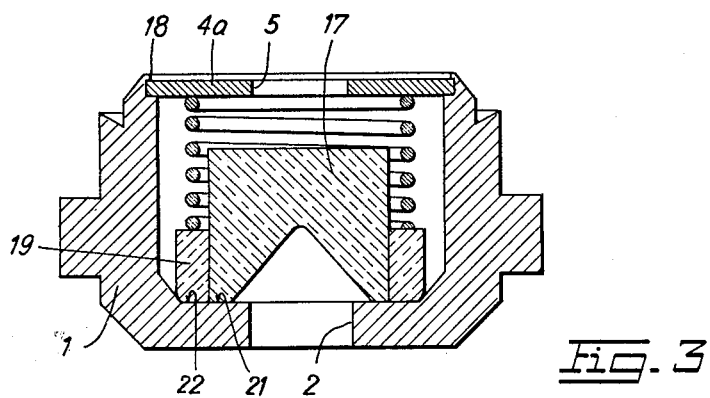
Figure 4:
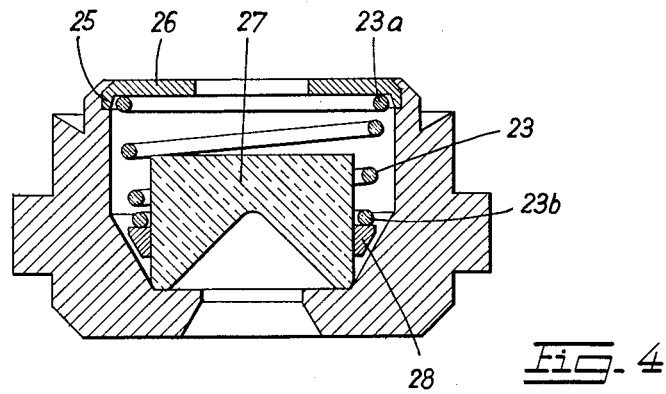

The third embodiment shown at FIG. 3 chiefly differs from the two first embodiments by the form of its movable bearing unit. The latter consists of a first cylindrical jewel 17, and a second ring-like jewel 19 set with force fit round jewel 17. The lower face 21 of jewel 17 is also provided with a conical pivot receiving lodging and the lower face 22 of jewel 19 is flush with face 21. This movable unit (17, 19) thus not only stands on the bearing end portion 6 of body member 1 by means of face 21 but also by means of face 22 of ring 19.

A comparison between the embodiments of FIGS. 1, 2 and 3 shows that the lower face 12 and the upper face 13 of jewel 8 in FIG. 1 have the same diameter, whereas the lower faces 20 (FIG. 2) and 21, 22 (FIG. 3) of the movable bearing units of the two last embodiments have a diameter larger than that of the upper faces of jewels 15 and 17, respectively. Moreover, the cover member 4a of this third embodiment is made with a smooth outer side-face and it is set in a corresponding lodging of body member 1. An edge 18 of the latter is bent over the peripheral portion of said cover to hold it definitely in place.

Besides the differences indicated the elements of the bearing of FIG. 3 are identical to the corresponding elements of the two first bearings described above.

The width of the end surface portion of the body member on which the movable bearing unit is standing must of course always be greater than the greatest possible displacement of this movable bearing unit in a radial direction, in order to avoid that the lower outer edge of the latter enters opening 2 during a radial displacement of said movable unit. If the lower outer edge of this movable unit could enter opening 2, this unit would of course remain clamped in that position and thus no more return to its centered position under the action of the return spring described, because this action is made as small as possible. The clearance between the shaft portion extending through opening 2 and the side wall of this opening must generally have a determined value. Since the greatest possible displacement of the movable bearing unit strongly depends on this clearance, it will be observed that the second and third embodiments enable making the bearing end portion 6 of the body member large enough.

The sizes of the inner space of the body member of the bearings described must of course also be large enough to avoid that the movable bearing unit located therein gets clamped between the cover member and the bottom portion of said body member. To avoid such a clamping the diameter of the movable bearing unit must be great enough. However, to reduce as much as possible the sizes of this body member as well as to make a return spring having a satisfactory strength, the movable bearing unit should be given a diameter as small as possible. A calculation made to conciliate these two opposed conditions with one another shows that the diameter $D$ of the movable bearing unit must approximately be made according to the following equation:

$$D \geq d + 2\Delta h \cdot tg\alpha$$

where $d$ is the diameter of opening 2, $\Delta h$ the possible displacement of said movable unit in axial direction and $\alpha$ half the opening angle of the centering surface portion 7. This angle $\alpha$ in turn must itself be made great enough to enable the bearing jewel sliding along the centering surface portion of the bearing upon an impact and also small enough to ensure the backward motion of said jewel after said impact. Calculations as well as tests have shown that this angle $\alpha$ must be comprised between 30 and 45°.

The fourth and the fifth embodiments principally differ from the first one by the shape of the coil spring.

In the fourth embodiment (FIG. 4) the return spring 23 is conical. Its largest coil 23a is bearing against a shoulder 25 of the cover member 26 of the bearing, whereas its smallest coil 23b is set round jewel 27 and bears on a ring 28 engaged with force fit around this jewel. As in the embodiments described above these end coils 23a and 23b of the return spring are flat in order to produce an section as uniform as possible all round the movable bearing unit.

The number of the coils of this spring 23 can be made a little bit greater than those of the cylindrical coil springs of the three first embodiments since the coils of this conical spring can partly enter one another when the movable bearing unit is moved axially toward the cover member of the bearing. This conical spring 23 also avoids that the jewel gets clamped by its upper outer edge engaging the coils of the spring when said movable unit is tilting upon an impact. This clamping can also be avoided by bevelling said upper outer edge of the jewel. The conical spring 23 has also the advantage that it cannot move laterally neither with respect to the bearing body member nor with respect to the jewel 27 since it has its end coils held the first one within the shoulder 25 of cover 26 and the second one engaged around jewel 27.

In the fifth embodiment (FIG. 5) the return spring 29 is made of a thread having a rectangular cross-section. During an impact occurring in an oblique or in a radial direction the coil springs described above are not only compressed but also bent. Now it will be observed that with a thread having a non circular cross-section the properties of the spring as regards bending can be varied without changing the properties of said spring as regards compressing.

Figure 5:
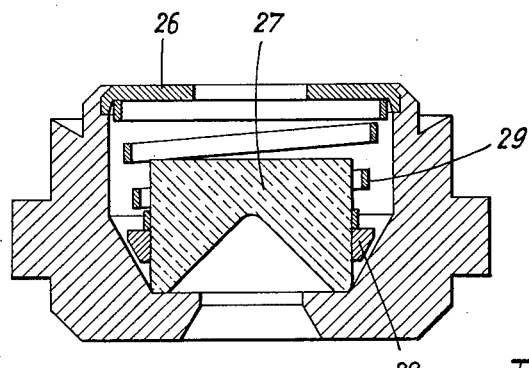

In further embodiments this return spring of the movable bearing unit could be made with a thread having still a rectangular cross-section however not upright as in FIG. 5, but perpendicular to the bearing axis or even oblique with respect thereto. With such threads the properties of the springs can be varied within very broad limits.

The main advantage of the bearings described resides in the fact that the movable bearing unit only comes in contact with the body member of the bearing along surface portions of the jewel forming part of said movable unit. Since the friction of a jewel portion on the metal is small the movable bearing unit will always easily slide along the centering surface portion of the body member thus ensuring said movable unit always coming back to its centered position under the action of its return spring. The latter can thus be made relatively weak so that the movable unit will yield already upon small impacts.

The bearings described have thus the advantage not only of protecting very fine pivots in a satisfactory manner but also that of reducing substantially the friction between said pivots and the bearing portions by which they are held.

Experiments made with bearings of the type described have shown that the return springs thereof can be made weak enough to enable a yielding motion of the movable units of these bearings upon impacts producing forces as small as 4 grams.

The bearings described have also the advantage that the strength of their return springs can be checked and adjusted easily in a very exact manner. Only because of their coiled form the springs disclosed can be given a length ensuring the desired strength. Moreover, in the first, fourth and fifth embodiments the rings 9 (FIG. 1) and 28 (FIGS. 4 and 5) also enable adjusting the strength of the spring, because they can be set at a different height along the jewel. In addition thereto the screwed cover member 4 (FIG. 1) still enables a further adjusting possibility of the spring strength.

While several embodiments of the invention have been disclosed in detail, various changes in the shape, sizes and arrangement of parts within the scope of the appended claims will appear obvious to those skilled in the art.

We claim:

1. In a shock absorbing pivot bearing for precision instruments, measuring apparatus and the like, in combination, a hollow body member having an inner surface comprising, at one end of said body member, a bearing portion and a centering portion located adjacent and around said bearing portion, and, at the other end of said body member, a spring resting portion facing said bearing and said centering portions, a movable pivot bearing unit comprising a spring resting face and a jewel provided with a seating face, said spring resting face and said seating face being directed in opposed directions and said seating face having substantially the same size as said bearing portion and being adapted for lying thereon, said movable pivot bearing unit having a pivot receiving surface disposed thereon substantially at the same level as that of said spring resting face, said seating face being delimited by an edge adapted for cooperation with said centering portion and said unit being located in said body member with the seating face of said jewel lying on said bearing portion, but with the other portions of said unit in spaced relationship to said inner face of the body member to enable free translational and tilting motions of said unit within said body member away from said bearing portion, and a coil spring in said body member extending coaxially thereto and having one end resting on said spring resting portion of the body member and the other end resting on said spring resting face of said movable pivot bearing unit and moving therewith, said spring normally holding the seating face of said jewel lying on said bearing portion of the bearing body member whereby the edge of said seating face adapted for cooperation with said centering portion are the only surfaces in frictional engagement upon said movable pivot bearing unit being radially displaced by a radial force thereon.

2. In a shock absorbing pivot bearing as claimed in claim 1, said movable pivot bearing unit consisting of a cylindrical jewel and a setting pressed on to said jewel so as to extend between its end faces, said setting carrying said spring resting face.

3. In a shock absorbing pivot bearing as claimed in claim 1, said body member being provided with a tapped lodging at its end opposite said bearing portion and said centering portion, a threaded cover element carrying said spring resting portion being screwed into said lodging.

4. In a shock absorbing pivot bearing as claimed in claim 1, said movable pivot bearing unit being provided with a conical pivot receiving opening, and said centering portion forming a truncated conical surface having an opening angle ranging between 60 and 90°.

5. In a shock absorbing pivot bearing as claimed in claim 1, said coil spring being conical and having its smaller end acting on said movable pivot bearing unit.

6. In a shock absorbing pivot bearing as claimed in claim 1, said coil spring being formed by a thread having a noncircular cross-section.

7. A shock absorbing bearing for precision instruments, measuring apparatus and the like comprising a hollow body member having at one end a bearing surface and at the other end a cover member, said bearing surface having an opening therein through which an end of a shaft passes, said body member having a hollow cylindrical portion of substantially the same diameter throughout, an angular centering surface disposed between said bearing surface and said cylindrical portion, a pivot bearing including a seating surface, a spring abutting surface and a pivot receiving surface disposed substantially at the same level as said spring abutting surface, said seating surface having disposed therein a conical pivot whose diameter in the plane of said seating surface is substantially the same as said opening, said seating surface having substantially the same diameter as said bearing surface, said seating surface including at the periphery thereof a portion adapted to easily engage said centering surface upon said pivot bearing being radially displaced by a radial force on said shaft, and a coil spring disposed between said cover member and said spring abutting surface to return the seating surface of said pivot bearing onto said bearing surface upon an axial as well as a radial displacement of said pivot bearing whereby said portion of said seating surface that easily engages said centering surface are the only surfaces in frictional engagement upon said pivot bearing being radially displaced by a radial force thereon.

References Cited in the file of this patent

UNITED STATES PATENTS

| 733,611 | Alton | July 14, 1903 |
| 1,843,868 | Copelin | Feb. 2, 1932 |
| 2,919,961 | Matthey | Jan. 5, 1960 |
| 2,996,339 | Loretan | Aug. 15, 1961 |

FOREIGN PATENTS

| 305,508 | Switzerland | May 2, 1955 |
| 908,387 | Great Britain | Feb. 25, 1959 |